United States Patent [19]

Allocca

[11] 4,241,405
[45] Dec. 23, 1980

[54] DATABASE UPDATING APPARATUS

[75] Inventor: Michael A. Allocca, Fairfield, Conn.

[73] Assignee: Pitney Bowes Inc., Stamford, Conn.

[21] Appl. No.: 931,500

[22] Filed: Aug. 7, 1978

[51] Int. Cl.³ .......................................... G01G 23/22
[52] U.S. Cl. .................................. 364/466; 364/900; 364/567; 360/6; 360/100; 360/136; 346/138
[58] Field of Search ... 364/200 MS File, 900 MS File, 364/466, 567; 101/415.1, 383, 382 R, 378; 360/100, 136, 6, 87; 346/138; 235/482, 486, 445, 475, 442, 58 PS, 61 PS, 92 WT, 432; 177/3, 5, 15, 25

[56] References Cited

U.S. PATENT DOCUMENTS

| | | | |
|---|---|---|---|
| 2,653,819 | 9/1953 | Roberts | 346/138 |
| 2,851,328 | 9/1958 | Fritzinger | 346/138 |
| 2,869,966 | 1/1959 | Cunningham | 346/138 |
| 2,889,191 | 6/1959 | Dinsmore et al. | 346/138 |
| 2,915,357 | 12/1959 | Barkley | 360/100 |
| 3,387,294 | 6/1968 | Silverman | 360/136 |
| 3,568,596 | 3/1971 | Mashburn | 101/415.1 |
| 3,711,655 | 1/1973 | Yamada | 364/87 |
| 3,872,239 | 3/1975 | Nelson | 346/138 |
| 4,004,139 | 1/1977 | Hall | 364/466 |
| 4,084,242 | 4/1978 | Conti | 364/466 |

*Primary Examiner*—Gareth D. Shaw
*Assistant Examiner*—C. T. Bartz
*Attorney, Agent, or Firm*—Donald P. Walker; William D. Soltow, Jr.; Albert W. Scribner

[57] ABSTRACT

In a storage system including a semi-permanent database there is provided apparatus for updating said database comprising: instrumentalities for reading magnetically recorded data and storing said data in said database; a rotatable drum having an exterior circumferentially-extending surface, said drum including a plurality of protrusions extending beyond said exterior surface; a flexible magnetic card including database updating data magnetically recorded on a major surface thereof, said card having opposed side edges extending lengthwise thereof and having a leading edge and a trailing end edge respectively extending transverse to the length thereof, the length of said card being such that one of said end edges is disposable in overlapping relationship with respect to the other of said end edges when said card is wrapped around said drum, said card having a plurality of apertures formed therein, said apertures located to permit registration of a sufficient number of said apertures with said drum protrusions when said card is wrapped around said drum with said major surface facing outwardly and with said end edges disposed in said overlapping relationship for aligning said card on said drum for rotation therewith; an adhesive material affixed to at least one of said end edges for removably adhering said overlapping edges to one another, whereby said card is removably mounted on said drum; and said reading means being disposed in reading relationship with respect to said card's major surface while said card is mounted on said drum.

9 Claims, 5 Drawing Figures

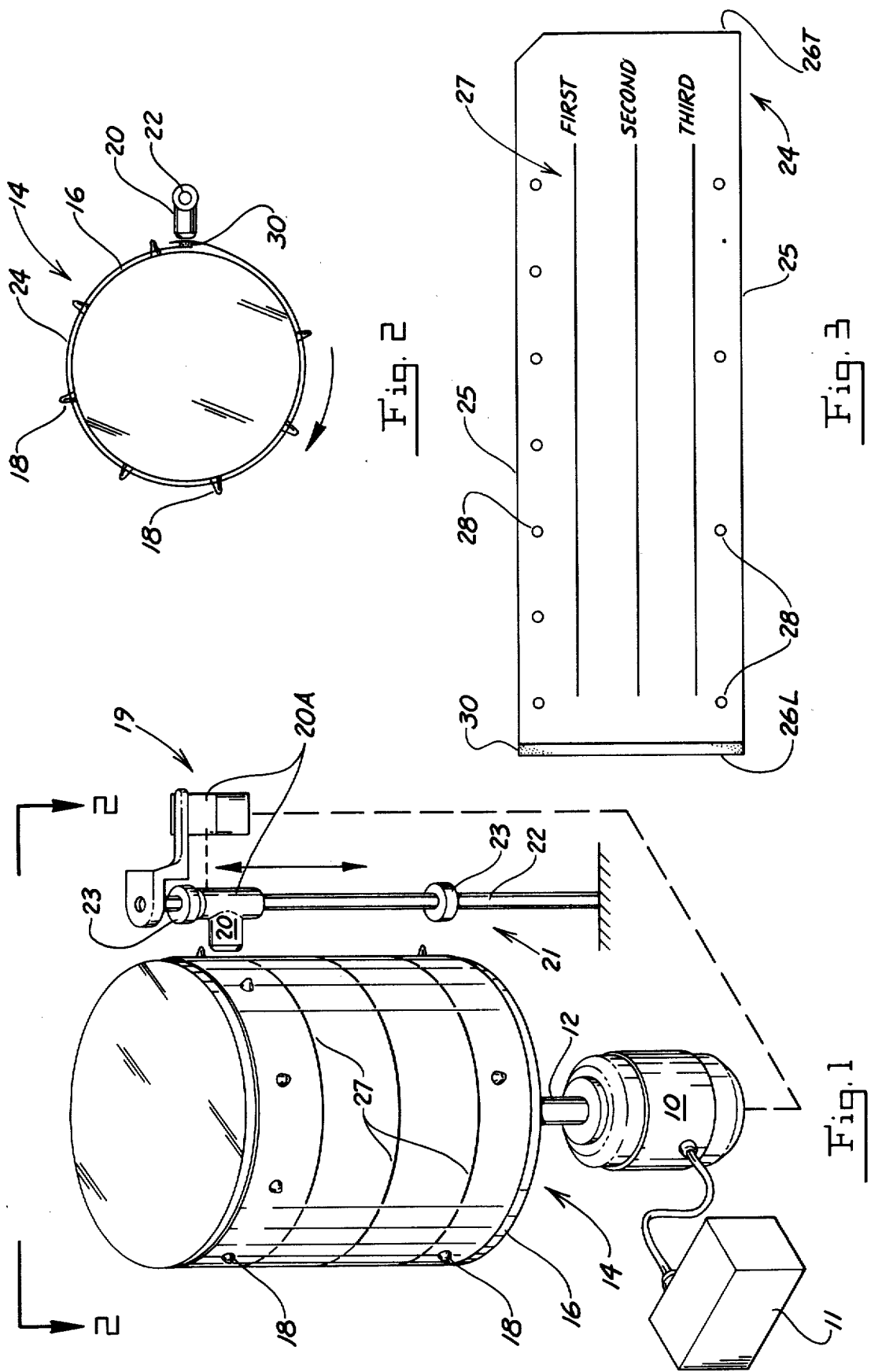

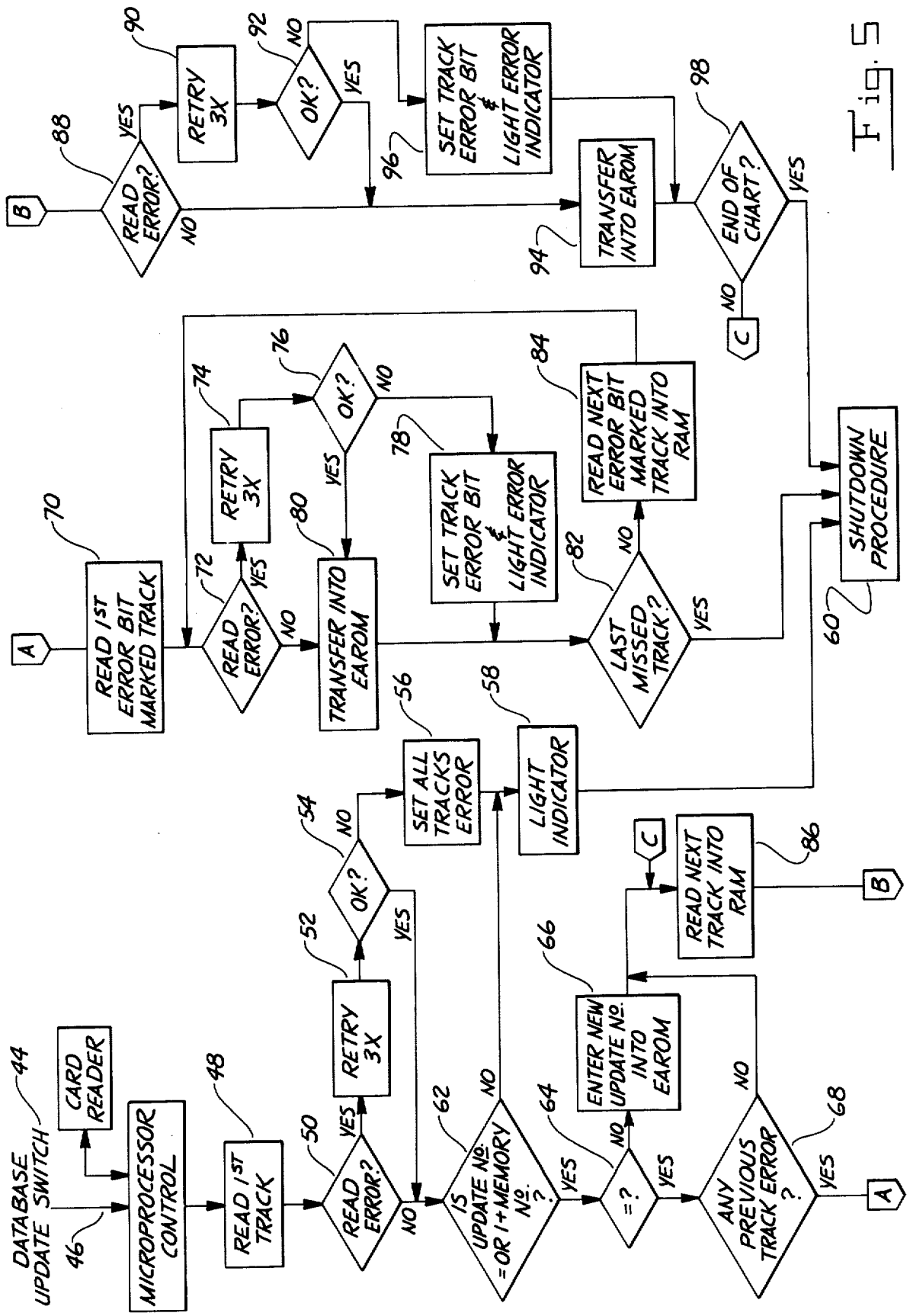

DATABASE UPDATING APPARATUS

BACKGROUND OF THE INVENTION

The present invention is generally concerned with apparatus for updating databases of data storage systems and more particularly with updating postal rate data in a postal meter/scale system. In connection with the latter application, the invention includes novel apparatus for changing the content of postal rate data stored in the semi-permanent database of a meter/scale system; which data reflects the latest version of such data as published by the U.S. Postal Service.

DESCRIPTION OF THE PRIOR ART

Permanent magnetic drum systems for use in computer applications are well known in the art, as shown and described, for example, in U.S. Pat. No. 2,794,180. Such magnetic drum systems are characteristically complex, and costly to manufacture and operate. Recent efforts to reduce the costs of manufacture and operation are disclosed in U.S. Pat. No. 3,813,678, which describes a demountable drum system which utilizes a plurality of fixed magnetic read heads, one for each track on the drum, for reading information magnetically recorded on a drum. Although drum systems with removable sheets have been suggested, for example, as shown in U.S. Pat. No. 2,869,966, the prior art appears to be silent on the subject of the provision of disposable magnetic cards containing database updating data, such as current postal rate data, which are easily removably mountable on a rotatable drum accessible to a magnetic card reader controlled by electronic processing means, for reading data on the card and storing the same in the postal rate database for subsequent use.

In addition, although the prior art describes various methods of attaching magnetic cards to rotatable drums, for example, as disclosed in U.S. Pat. Nos. 3,387,294, 2,653,819, 2,851,328, 2,889,191 and 2,915,357, the prior art appears to be silent as regards the provision of adhesive means for removably retaining such cards in place on such drums.

Accordingly:

an object of the present invention is to provide apparatus for updating the database of a data storage system of the type which includes a semi-permanent database;

another object is to provide such apparatus in a meter/scale system which includes a semi-permanent postal rate database; and, another object is to provide apparatus for updating databases including magnetic reading means, drum means on which the card may be mounted and a disposable magnetic card having database updating data recorded thereon.

SUMMARY OF THE INVENTION

In a data storage system including a semi-permanent database there is provided apparatus for updating said database comprising: instrumentalities for reading magnetically recorded data and storing said data in said database; a rotatable drum having an exterior circumferentially-extending surface, said drum including a plurality of protrusions extending beyond said exterior surface; a flexible magnetic card including database updating data magnetically recorded on a major surface thereof, said card having opposed side edges extending lengthwise thereof and having a leading edge and a trailing end edge respectively extending transverse to the length thereof, the length of said card being such that one of said end edges is disposable in overlapping relationship with respect to the other of said end edges when said card is wrapped around said drum, said card having a plurality of apertures formed therein, said apertures located to permit registration of a sufficient number of said apertures with said drum protrusions when said card is wrapped around said drum with said major surface facing outwardly and with said end edges disposed in said overlapping relationship for aligning said card on said drum for rotation therewith; an adhesive material affixed to at least one of said end edges for removably adhering said overlapping edges to one another, whereby said card is removably mounted on said drum; and said reading means being disposed in reading relationship with respect to said card's major surface while said card is mounted on said drum.

BRIEF DESCRIPTION OF THE DRAWINGS

FIG. 1 is a perspective view of the database updating apparatus according to the invention;

FIG. 2 is a section of a portion of the apparatus of FIG. 1 taken substantially along line 2—2 of FIG. 1;

FIG. 3 is a top plan view of a magnetic card according to the invention;

FIG. 5 is a flow diagram of the operation of the reading means and storing means shown in FIG. 4.

DESCRIPTION OF THE PREFERRED EMBODIMENT

Figure 4:
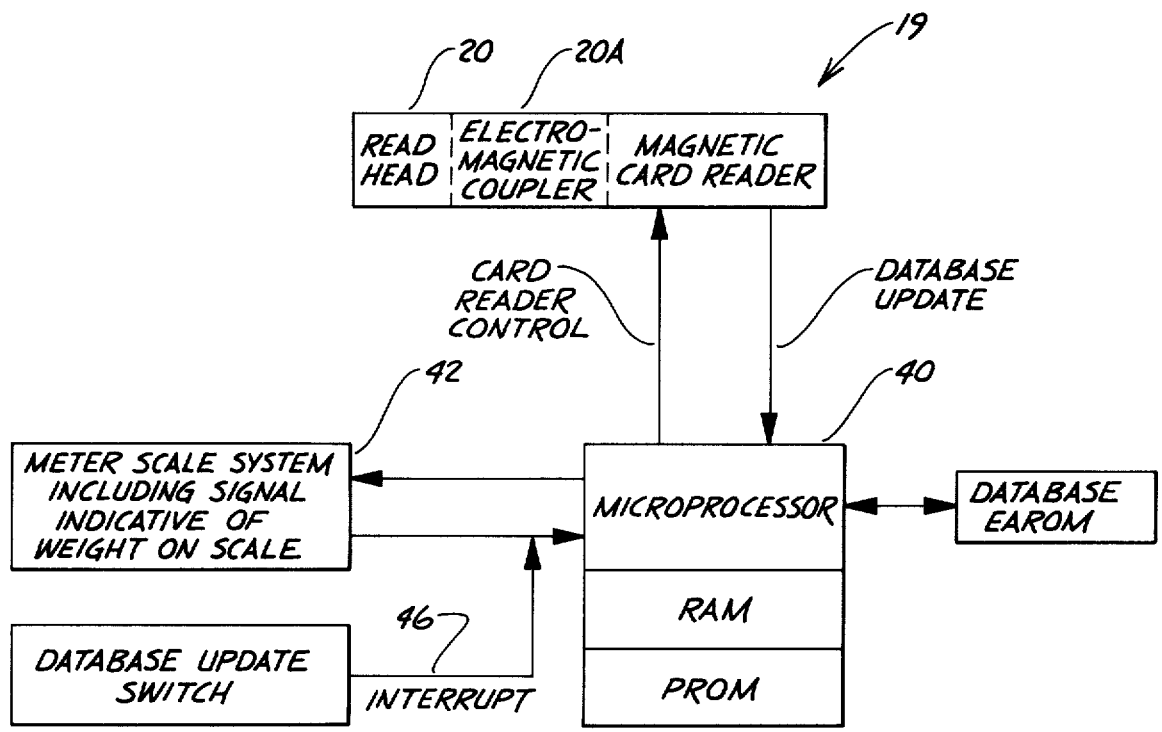
FIG. 4 is a schematic representation of details of the means for reading magnetically recorded data and means for storing said data in a database shown in FIG. 1.

The database updating apparatus in accordance with the invention is shown in FIG. 1 to include an electric motor 10 adapted by well-known means to be energized from a suitable source of supply of power 11. The motor 10 includes a drive shaft 12 fixedly attached to a drum 14 for rotation of the drum 14 about its longitudinally extending axis. The drum 14, which is preferably made of non-magnetizable material, has an exterior surface 16 and includes a plurality of protrusions 18 extending beyond the exterior surface 16. The protrusions 18 are arranged in two parallel rows, each of which circularly extends around the exterior surface 16 of the drum 14. And the respective protrusions 18 in each row are located at equidistantly spaced intervals from each other.

As shown in FIG. 1, the database updating apparatus comprises reading means well-known in the art including a magnetic reader 19, having a read head 20, and guide means 21. The guide means includes an upright post 22 on which the read head 20 is slidably mounted. The post 22 is preferably suitably fixedly mounted adjacent to the exterior surface of the drum 14 so as to extend parallel to the axis of the drum 14 for guiding the read head 20 in sufficiently close proximity to the exterior surface 16 of the drum 14 to permit the head 20 to read magnetically recorded information from a data card wrapped around the exterior surface 16 of the drum 14. The magnetic reader 19 also includes means well-known in the art, such as an electro-mechanical means 20A for moving the read head along the post 22 in response to instructional signals for doing so. And, the guide means 21 also includes a pair of vertically spaced stops 23 mounted on the post 22 for constraining movement of the head 20 to movement between the two rows of drum protrusions 18, with a view to permitting disposition of the head 20 in closer proximity to the exterior surface 16 of the rotating drum 14 than the protrusion 18 would otherwise permit, due to the extent the protrusions 18 extend beyond the drum's exterior surface 16.

Referring now to FIGS. 2 and 3, there is shown a flexible data card 24 having a generally rectangular shape and including at least one major surface which is coated, impregnated or otherwise provided with a magnetic material adapted to be selectively magnetized. The card 24 has opposed, spaced-parallel, longitudinally extending side edges 25; and opposed, spaced-parallel Leading and Trailing end edges, 26L and 26T, each of which extends transverse to respective side edges 25 and thus to the longitudinal length of the card 24. As is well-known in the art, selective magnetization of the magnetizable surface of the card 24 causes data to be magnetically recorded on the magnetizable surface of the card 24. In the preferred embodiment, data is thereby stored in a plurality of lines of data or tracks, shown generally at 27. The tracks 27 are spaced parallel to each other and to the side edges 25 of the card 24. For the purpose of this discussion, tracks 27 are identified as the first, second and third tracks. The card 24 also includes a plurality of apertures 28 suitably arranged in rows and located at intervals from each other to permit registration of a sufficient number of the apertures 28 with the drum protrusions 18, when the card 24 is wrapped around the drum 14 with its magnetizable surface facing outwardly, for aligning the card 24 on the drum 14 for rotation therewith. Preferably, more apertures 28 than protrusions 18 should be provided to facilitate locating the end edges 26L and 26T at one of a plurality of locations on the drum's exterior surface. And, to ensure proper orientation and alignment of the card 24 on the drum 14 for reading purposes, it is preferred that the number of protrusions 18 in each row be different from one another.

In addition, the card 24 includes a strip of adhesive material 30 which is adhesively or otherwise affixed to at least one of the end edges of the card 24, so that when the card 24 is wrapped around the drum 14 and aligned thereon by means of the protrusions 18, the trailing edge 26T overlaps and is adhered to the leading edge 26L. With this arrangement when the drum 14 rotates, for example clockwise as shown in FIG. 2, the magnetic read head 20 cannot unwrap the card 24 from the drum 14, but rather, if the card's trailing edge 26T is loosened from overlapping adherence with the leading edge 26L and any portion of the card 24 inadvertently contacts the read head 20, the head 20 tends to urge the card 24, including the trailing edge 26T, toward the drum's exterior surface 16 and thereby urge the trailing edge 26T into readherence with the leading edge 26L.

In addition to the foregoing, the database updating apparatus comprises electronically operable means suitably coupled to the reading means for storing data read from the card 24. The storing means (FIG. 1) includes means for controlling the storage of data including a microprocessor 40 (FIG. 4), such as the Model 8080 available from the Intel Corporation, and a Random Access Memory (RAM), such as the Model 2102 available from the National Semiconductor Corporation, operatively connected to one another and to the card reading means by means well-known in the art. In the preferred embodiment of the invention, the storing means also includes a RAM for temporarily storing data, for example, postal rate data read from the magnetic card 24 by the card reader 19, such data being temporarily stored in the RAM under the control of the microprocessor 40. The data storage means also includes a Programmable Read-Only Memory (PROM), such as the Model 2708 available from the National Semiconductor Corporation, which is operatively connected by well-known means to the microprocessor 40 and has permanently stored therein instructions in the form of a program which is executed by the microprocessor 40. In addition, the data storage means includes an Electrically Alterable Read-Only Memory (EAROM), such as the Model ER 3400 available from the General Instrument Corporation, which is operatively connected by well-known means to the microprocessor 40 and semi-permanently stores data, such as postal rate data, transferred thereto from the RAM under the control of the microprocessor 40. In the preferred embodiment the postal rate data stored in the EAROM is currently used in the Meter/Scale Apparatus 42.

In the prior art a microprocessor 40 (FIG. 4) has been adapted to receive electronic signals corresponding to weights placed on a postal scale, from Meter/Scale Apparatus 42, for example, as shown in U.S. Pat. No. 4,131,946, issued Dec. 26, 1978 to D. F. Dlugos for a Mailing System and assigned to the assignee of the present invention. And, it is understood that the subject matter of said Patent is incorporated herewith by reference. In accordance with the preferred embodiment of the invention the postal scale of the Meter/Scale Apparatus 42 is modified to include a manually actuatable database-update switch 44; and the microprocessor 40 is adapted to receive an electronic interrupt signal 46 from the switch 44 to disable microprocessing of meter/scale signals other than those utilized for database updating purposes, including all signals corresponding to weights on the scale, when the database-update switch 44 is manually actuated.

It is understood in the following discussion that, when it is appropriate to do so, the microprocessor 40 signals the card reading means 19 to move the read head 20 along the guide post 22 for timely accessing the first, second and third tracks 27 on the card 24. For example, when the database-update switch 44 on the postal scale is manually actuated, an instructional signal is supplied to the power source 11 by the microprocessor 40 to energize the motor 10 from the power source 11, thereby rotating the drum 14. In response to the interrupt signal 46 the microprocessor 40 also suspends processing any other signals which the microprocessor 40 may be adapted to receive in connection with the operation of the Meter/Scale Apparatus 42 and signals to the card reading means to move the read head 20 along the upright post 22 to a position in registry with the first track of tracks 27.

The microprocessor 40 then proceeds to execute reading instructions stored in the PROM (FIG. 5). The card reader 19 reads the data contained in the first track 27 of the card 24 into the RAM, program step 48 (FIG. 5), and detects read errors if present, step 50. If a read error has occurred, the microprocessor 40 instructs the card reader 19 to try reading the data contained in the first card track 27 three more times, step 52. If the read error continues to be present, step 54, after three tries, the microprocessor 40 executes the shutdown procedure, step 60, either alone or in combination with a preliminary shutdown procedure including setting an error bit in the PROM to mark the information stored therein as being erroneous with respect to the information stored on each of the tracks 27, step 56, to prevent further execution of the program and illuminating an indicator lamp, step 58. Whether or not a read error occurs the shutdown procedure includes the steps of deenergizing the motor 10 and magnetic card reader 19, step 60. If an error is not detected, then the first card track 27 (FIG. 3) is assumed to have been read correctly by the card reader 19; and processing continues.

In practice, the first track 27 of the card 24 (FIG. 3) is magnetically marked with a number identifying the data on the card as being current as of a given date; and up-dated versions of substantially the same data are identified by higher numbers. The version number of the data on the card 24 is compared, step 62, to the version number of data presently stored in the EAROM.

If the version number of the data card is lower than the version number stored in the EAROM, step 62, indicating that the information on the card 24 is obsolete, the microprocessor 40 executes the previously described shutdown procedure, step 60, either alone or in combination with a partial preliminary shutdown procedure, which includes illuminating an indicator lamp, step 58.

If the version number on the card 24 is greater than the version number stored in the EAROM, step 64, indicating that the information on the card is an updated version of the data stored in the EAROM, the microprocessor 40 transfers the information from the first track 27 into the EAROM, step 66. The microprocessor 40, step 86, then instructs the card reader 19 (FIGS. 1-5) to position the read head 20 on the post 22 adjacent to the second track 27 on the card 24. Whereupon the microprocessor 40 instructs the card reader 19 to read the data contained in the second track 27, and store the same in the RAM, step 86. The microprocessor 40 then executes a read error program commencing with step 88.

Assuming a read error occurs, the card reader 19 retries three times to effect a change in the data stored in the RAM. If the read error is still present after the third read try, step 92, an error bit is set in the PROM to indicate that the data in the RAM which corresponds to the data in the second track 27 of the card 24 has not been stored in the EAROM; an indicator lamp is then illuminated, step 96, and the microprocessor 40 instructs the card reader 19 to position the read head 20 adjacent to the third track 27. The microprocessor 40 then instructs the card reader 19 to read the data contained in third track 27. If the track contains no data the microprocessor 40 assumes that the second track 27 was the last track 27 containing data, step 98, and executes the shutdown procedure, step 60. If the third track 27 contains data, then the microprocessor 40 instructs the card reader 19 to read the data in the third track 27 and store the same in the RAM, step 86, in place of the data stored therein from the erroneous data of the second track 27. Processing then continues, as previously described for each succeeding track, step 86.

Assuming a read error does not occur, either in the course of accessing the second track 27 or after one or more of the retries, step 90, the microprocessor 40 transfers the data from the RAM to the EAROM, step 94. Processing continues to step 98 and the shutdown procedure, step 60, is executed or the next track is read, step 86, as the case may be.

At this point it is appropriate to summarize the status of the EAROM and the RAM as a result of entering or attempting to enter data contained on the card 24. Table I, shown below, presents the resulting status of memory when the data on a card 24 is read.

TABLE I

SUMMARY OF MEMORY STATUS

| CONDITION OF CARD | STATUS OF EAROM | STATUS OF RAM |
|---|---|---|
| Obsolete version: | | |
| Defective first track | Error bits corresponding to all tracks on card are set | Existing contents not affected |
| Defective subsequent tracks | Existing contents not affected | Existing contents not affected |
| Readable tracks | Existing contents not affected | Existing contents not affected |
| Updated version: | | |
| Defective first track | Error bits corresponding to all tracks on card are set | Existing contents not affected |
| Defective subsequent tracks | Error bit corresponding to each defective track is set | Existing contents are partially updated |
| Readable tracks | Existing contents are updated | Existing contents are updated |

As shown in Table I, error bits are set in the EAROM whenever an unsuccessful try to read the data from a card 24 is made. As hereinbefore discussed the first track 27 is preferably treated differently than subsequent tracks 27, in that if a read error occurs while attempting to read data contained in the first track 27, error bits corresponding to all tracks are set in the EAROM; whereas if a read error occurs while attempting to read data contained in the second or subsequent track 27 only an error bit corresponding to the track 27 where the error is found is set in the EAROM. This arrangement is illustrative of a preferred manner of the processing information wherein it is assumed that identification, instructional or other preliminary information is stored in the first track 27 but not in the other tracks 27. In an embodiment wherein such information is not stored in the first track 27, the first track 27 could be treated the same as the other tracks 27.

Assuming the operator decides to retry a given card 24 or a new card 24 having the same version number as that which is stored in the EAROM; and the data is successfully processed through to step 64, indicating that the version number of the data in the EAROM is equal to the version number of the data on the card 24; if no read error occurred while reading the data in any track 27 of the original card 24, step 68, data in the next track 27 is accessed and read into the RAM, step 86, and processing continues as hereinbefore described. If, however, one or more of the error bits occurred while reading the data in any track 27 of the original card 24, step 68, the microprocessor 40 instructs the card reader 19 to access the first of these error bit marked tracks 27 and to read that track's data into the RAM, step 70.

If a read error occurs while reading the data of the first error bit marked track 27, the card reader 19 accesses the data in this track 27 three more times, step 74. If any read error is still present after the third try, step 76, a partial preliminary shutdown procedure is performed, step 78, as hereinbefore described; which includes illuminating an indicator lamp and setting a new error bit in the PROM in place of the error bit previously set therein. If this error bit marked track 27 is also the last error bit marked track 27, step 82, the shutdown procedure is performed, step 60. If, however, the error bit marked track 27 is not the last track so marked, the microprocessor 40 instructs the card reader 19 to access the next error bit marked track 27 on the card 24, step 84. Processing then continues, as previously described.

If a read error does not occur while reading the data of the first error bit marked track 27, step 72, the data read from the track 27 is stored in the EAROM, step 80. If this track 27 is also the last error bit marked track 27, step 82, the shutdown procedure is performed, step 60, as hereinbefore described. If, however, the accessed track 27 is not the last error bit market track 27, the microprocessor 40 instructs the card reader 19 to access the next error bit marked track 27 on the card 24, step 84. Processing then continues, as previously described.

In the above procedure, it can be seen that data missing from the EAROM due to read errors is added to the EAROM by reading the original card 24 more than once or by obtaining and reading another card 24 containing data identified by the same version number. Only tracks 27 that had caused marking the PROM with read error bits are reread for updating purposes. Error bit marks in the PROM are thus used to indicate which tracks 27, if any, will be reread when a card bearing a previously read version number is mounted on the drum 14 and processed.

In accordance with the objects of the invention, there has been described apparatus for updating the database of a data storage system, for example, in a meter/scale system which includes a postal rate database.

Inasmuch as certain changes may be made in the above described invention without departing from the spirit and scope of the same, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. In combination with a postal scale, and means for receiving signals, wherein said signal receiving means includes means for semi-permanently storing data in a postal rate database, and said signal receiving means is adapted for receiving signals corresponding to a weight on the scale, apparatus for updating said database comprising:
   a. means for reading magnetically recorded data;
   b. means for interrupting said signals which correspond to a weight on the scale;
   c. said storing means coupled to said reading means for storing data received therefrom in said database;
   d. a rotatable drum having an exterior circumferentially-extending surface; said drum including a plurality of protrusions extending beyond said exterior surface;
   e. a flexible card including postal rate data magnetically recorded on a major surface thereof, said card having a plurality of apertures formed therein, said apertures located to permit registration of apertures with said protrusions for properly mounting said card on said drum for rotation therewith; and
   f. said reading means including a read head disposed in reading relationship with respect to said card's major surface while said card is mounted on said drum.

2. The apparatus of claim 1, wherein said card has a leading edge and a trailing edge, and said trailing edge is disposed in overlapping relationship with respect to said leading edge when said card is mounted on said drum.

3. The apparatus of claim 1, wherein said drum protrusions are disposed in two parallel rows, each of said rows circularly-extending around the exterior surface of said drum, and each of said protrusions in a given row of protrusions is equidistantly spaced from the next adjacent protrusions in the same row.

4. The apparatus according to claim 1, wherein said reading means includes means for movably mounting said read head.

5. The apparatus according to claim 1, wherein said read head is disposed in closer proximity to said drum surface than said protrusions extend beyond said drum surface.

6. The apparatus according to claim 1, wherein said reading means includes means for constraining movement of said read head.

7. The apparatus according to claim 2, wherein said adhering means includes adhesive means affixed to at least one of said edges for removably adhering said overlapping edges to one another.

8. The apparatus according to claim 3, wherein said card apertures are arranged in rows spaced from each other the same distance as the respective rows of drum protrusions are spaced from each other, and the number of card apertures in each row thereof is sufficient to permit location of said edges at any one of a plurality of locations on the exterior surface of said drum.

9. The apparatus of claim 3, wherein said card apertures are arranged in two parallel rows spaced from each other the same distance as the respective rows of drum protrusions are spaced from each other, and the number of drum protrusions in each row thereof is sufficiently different to ensure properly mounting said card on said drum for reading purposes.

* * * * *

UNITED STATES PATENT AND TRADEMARK OFFICE
CERTIFICATE OF CORRECTION

PATENT NO. : 4,241,405
DATED : December 23, 1980
INVENTOR(S) : Michael A. Allocca It is certified that error appears in the above—identified patent and that said Letters Patent is hereby corrected as shown below:

Column 7, line 16, change "market" to -- marked --.

Signed and Sealed this

Third Day of November 1981

[SEAL]

Attest:

GERALD J. MOSSINGHOFF

Attesting Officer     Commissioner of Patents and Trademarks